US006358568B1

United States Patent
Schwarte et al.

(10) Patent No.: US 6,358,568 B1
(45) Date of Patent: Mar. 19, 2002

(54) POWDER VARNISH DISPERSION

(75) Inventors: Stephan Schwarte, Emsdetten; Joachim Woltering; Hubert Baumgart, both of Münster, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/508,927

(22) PCT Filed: Aug. 29, 1998

(86) PCT No.: PCT/EP98/05512

§ 371 Date: May 8, 2000

§ 102(e) Date: May 8, 2000

(87) PCT Pub. No.: WO99/15593

PCT Pub. Date: Apr. 1, 1999

(30) Foreign Application Priority Data

| Sep. 20, 1997 | (DE) | 197 41 555 |
| Oct. 9, 1997 | (DE) | 197 44 561 |
| Jul. 17, 1998 | (DE) | 198 32 107 |

(51) Int. Cl.⁷ .................................. B05B 5/04
(52) U.S. Cl. .................. 427/484; 427/485; 523/406; 523/407; 523/410; 525/327.3; 525/375; 525/381
(58) Field of Search .................. 523/406, 407, 523/410; 525/327.3, 375, 381; 427/484, 485

(56) References Cited

U.S. PATENT DOCUMENTS 5,965,213 A  * 10/1999 Sacharski et al. ........... 427/475

FOREIGN PATENT DOCUMENTS

| EP | WO 96/32452 | 10/1996 | ......... C09D/133/06 |
| EP | WO 97/08235 | 3/1997 | ......... C08K/5/3492 |

* cited by examiner

Primary Examiner—Robert Dawson
Assistant Examiner—D. Aylward

(57) ABSTRACT

The present invention relates to a transparent powder coating dispersion comprising a solid, pulverulent component A and an aqueous component B, component A being a powder coating material comprising a) at least one epoxy-containing binder having a content of from 30 to 45%, preferably from 30 to 35%, by weight of glycidyl-containing monomers, with or without a content of vinylaromatic compounds, preferably styrene, b) tris(alkoxycarbonylamino)triazine and polycarboxylic acids, preferably straight-chain aliphatic dicarboxylic acids and/or carboxy-functional polyesters, as crosslinking agents, component B being an aqueous dispersion comprising a) at least one nonionic thickener.

18 Claims, No Drawings

POWDER VARNISH DISPERSION

The present invention relates to a transparent powder coating material and to an aqueous transparent powder coating dispersion which is particularly suitable as a coating for car bodies that are coated with waterborne coating material.

At present, liquid coating materials are preferably used for the coating of car bodies. These coating materials cause numerous environmental problems owing to their solvent content. This is true even when aqueous coating materials are employed.

For this reason, increased efforts have been made in recent years to use powder coating materials for the coating. The results to date, however, have been unsatisfactory; in particular, transparent powder coating materials still exhibit weaknesses in terms of chemical resistance and yellowing. Epoxy/carboxy-crosslinked transparent powder coatings exhibit a markedly poorer etch resistance relative to water, tree resin and sulphuric acid.

In the meantime, there have been numerous developments with the aim of developing powder coating materials in the form of aqueous dispersions which can be processed using liquid coating technologies. U.S. Pat. No. 4,268,542, for example, discloses a process which uses a powder coating slurry that is suitable for the coating of cars. In this case, a conventional powder layer is first of all applied to the body and the clearcoat slurry is applied as second layer. In this clearcoat slurry, which is based on acrylate resins, ionic thickeners are used, leading to relatively high sensitivity of the applied coating layer to moisture, especially to condensation. In addition, these thickeners have a content of glycidyl-containing monomers which in one of the examples is from 0.5 to 30%. Moreover, it is necessary to operate with high stoving temperatures (above 160° C.).

In the text below, the term transparent powder coating dispersion is used synonymously with transparent powder coating slurry.

DE-A 196 13 547 discloses an aqueous powder coating dispersion which meets the specified requirements. Following application and crosslinking, however, the transparent powder coating dispersion described therein, just like the solid transparent powder coating materials known to date, exhibits low values in terms of etch resistance to water, tree resin and sulphuric acid. In addition, the system shows a tendency towards yellowing.

The object of the present invention is to provide an aqueous powder coating dispersion comprising
a solid, pulverulent component A and an aqueous component B, where
component A is a transparent powder coating material comprising
  a) at least one epoxy-containing binder having a content of from 30 to 45%, preferably from 30 to 35%, of glycidyl-containing monomers, with or without a content of vinylaromatic compounds, preferably styrene,
  b) tris(alkoxycarbonylamino)triazine and polycarboxylic acids, preferably straight-chain aliphatic dicarboxylic acids and/or carboxy-functional polyesters, as crosslinking agents, and
  c) if desired, catalysts, auxiliaries, additives typical for transparent powder coating materials, such as degassing agents, levelling agents, UV absorbers, free-radical scavengers, antioxidants,
and
component B is an aqueous dispersion comprising
  a) at least one nonionic thickener and
  b) if desired, catalysts, auxiliaries, defoamers, dispersing auxiliaries, wetting agents, preferably carboxy-functional dispersants, antioxidants, UV absorbers, free-radical scavengers, small amounts of solvent, levelling agents, biocides and/or water retention agents.

The content of glycidyl-containing monomers is preferably from 25 to 45%. Particular preference is given to from 30 to 45% by weight, in particular from 30 to 40%. From 30 to 35% are very particularly preferred. Utmost preference is given to 26–35%, especially from 27 to 33%.

The following proportions are preferred in this context:
a) 60–80 parts
b) 15–30 parts
c) 3–10 parts A suitable epoxy-functional binder for the solid transparent powder coating material comprises, for example, epoxy-functional polyacrylate resins which can be prepared by copolymerizing at least one ethylenically unsaturated monomer which contains at least one epoxy group in the molecule with at least one further ethylenically unsaturated monomer which contains no epoxy group in the molecule, at least one of the monomers being an ester of acrylic acid or methacrylic acid. Epoxy-functional polyacrylate resins of this kind are known, for example, from EP-A-299 420, DE-B-22 14 650, DE-B-27 49 576, U.S. Pat. No. 4,091,048 and U.S. Pat. No. 3,781,379.

Examples of ethylenically unsaturated monomers which contain no epoxy group in the molecule are alkyl esters of acrylic and methacrylic acid containing 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers which contain no epoxy groups in the molecule are acid amides, such as acrylamide and methacrylamide, vinylaromatic compounds, such as styrene, methylstyrene and vinyltoluene, nitrites, such as acrylonitrile and methacrylonitrile, vinyl halides and vinylidene halides, such as vinyl chloride and vinylidene fluoride, vinyl esters, such as vinyl acetate, and hydroxyl-containing monomers, such as hydroxyethyl acrylate and hydroxyethyl methacrylate, for example.

The epoxy-functional monomers employed in the epoxy-functional binders are preferably glycidyl acrylate, glycidyl methacrylate and allyl glycidyl ether.

The epoxy-functional polyacrylate resin normally has an epoxide equivalent weight of from 300 to 2500, preferably from 420 to 700, a number-average molecular weight (determined by gel permeation chromatography using a polystyrene standard) of from 2000 to 20,000, preferably from 3000 to 10,000, and a glass transition temperature ($T_g$) of from 30 to 80, preferably from 40 to 70 and, with particular preference, from 40 to 60° C. (measured with the aid of Differential Scanning Calorimetry (DSC)). Very particular preference is given to about 50° C. Mixtures of two or more acrylate resins can also be employed.

The epoxy-functional polyacrylate resin can be prepared by common and well-known methods, by addition polymerization.

As component (b), tris(alkoxycarbonylamino)triazines in accordance with U.S. Pat. No. 4,939,213, U.S. Pat. No. 5,084,541 and EP 0 624 577 are employed. Such compounds are also known from DE 2509561 and also Patent Abstracts of Japan, Publ. No. 09194769 A. However, the tris(alkoxycarbonylamino)triazines are employed therein only for cationic electrodeposition coating materials.

In accordance with the invention, the tris(alkoxycarbonylamino)triazines are of the formula

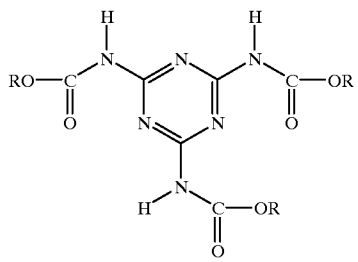

in which R=methyl, butyl, ethylhexyl groups. Derivatives of these compounds can also be employed.

The invention prefers the methyl-butyl mixed esters. These have the advantage over the plain methyl esters of better solubility in polymer melts, and butylethylhexyl mixed esters. The plain butyl esters are also preferred in accordance with the invention.

The tris(alkoxycarbonylamino)triazines and their derivatives can also, in accordance with the invention, be employed in a mixture with conventional crosslinking agents (component C). Here, blocked polyisocyanates different from the tris(alkoxycarbonylamino)triazines are particularly suitable. Similarly, it is possible to employ amino resins, e.g. melamines. The tris(alkoxycarbonylamino)triazines can be present in amounts of from 1 to 10, preferably from 2 to 10% by weight. In principle it is possible to employ any amino resin suitable for transparent topcoats, or a mixture of such amino resins.

Resins of this kind are well known to the person skilled in the art and are offered as commercial products by numerous companies. Amino resins are condensation products of aldehydes, especially formaldehyde, and, for example, urea, melamine, guanamine and benzoguanamine. The amino resins contain alcohol groups, preferably methylol groups, some or all of which in general are etherified with alcohols.

Further suitable crosslinkers are carboxylic acids, especially saturated, straight-chain, aliphatic dicarboxylic acids having 3 to 20 carbon atoms in the molecule. It is very particularly preferred to employ dodecane-1,12-dioic acid. In order to modify the properties of the finished transparent powder coating materials, other carboxyl-containing crosslinkers may also be employed if desired. As examples of these mention may be made of saturated branched or unsaturated straight-chain di- and polycarboxylic acids and of polymers having carboxyl groups.

Suitability also extends to transparent powder coating materials which comprise an epoxy-functional crosslinker and an acid-functional binder.

Examples of suitable acid-functional binders are acidic polyacrylate resins which can be prepared by copolymerizing at least one ethylenically unsaturated monomer containing at least one acid group in the molecule with at least one further ethylenically unsaturated monomer containing no acid group in the molecule.

The epoxy-functional binder and the carboxyl-functional crosslinker and, respectively, the carboxyl binder and epoxy crosslinker are normally employed in an amount such that there are from 0.5 to 1.5, preferably from 0.75 to 1.25, equivalents of carboxyl groups per equivalent of epoxy groups. The amount of carboxyl groups present can be determined by titration with an alcoholic KOH solution.

In accordance with the invention the binder includes vinylaromatic compounds, especially styrene. In order to limit the risk of cracking on exposure to weathering, however, their content is not more than 35% by weight. Preference is given to from 10 to 25% by weight.

If desired, the solid powder coating materials include one or more suitable catalysts for curing the epoxy resin. Suitable catalysts are phosphonium salts of organic or inorganic acids, quaternary ammonium compounds, amines, imidazole and imidazole derivatives. The catalysts are generally employed in proportions of from 0.001% to about 2% by weight, based on the overall weight of the epoxy resin and of the crosslinking agent.

Examples of suitable phosphonium catalysts are ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide and tetrabutylphosphonium acetateacetic acid complex. These and other suitable phosphonium catalysts are described, for example, in U.S. Pat. No. 3,477,990 and U.S. Pat. No. 3,341,580.

Examples of suitable imidazole catalysts are 2-styrylimidazole, 1-benzyl-2-methylimidazole, 2-methylimidazole and 2-butylimidazole. These and other imidazole catalysts are described, for example, in Belgian Patent No. 756,693.

In addition, the solid powder coating materials may also, if desired, comprise auxiliaries and additives. Examples thereof are levelling agents, antioxidants, UV absorbers, free-radical scavengers, flow aids and degassing agents, such as benzoin, for example.

The solid powder coating materials are prepared by known methods (cf. e.g. product information from BASF Lacke+Farben AG, "Pulverlacke" [powder coatings], 1990) by homogenization and dispersion by means, for example, of an extruder, screw kneading apparatus and the like. Following preparation of the powder coating materials, they are prepared for dispersion by grinding and, if desired, by classifying and sieving.

The described component A is dispersed, in accordance with the invention, in the aqueous component B.

The content of glycidyl-containing monomers is preferably from 25 to 40%. Particular preference is given to contents of from 26 to 35%. Utmost preference is given to contents of from 27.5 to 32.5%.

In this context, preference is given to the following proportions:

Component A
a) 60–80 parts
b) 15–30 parts
c) 3–10 parts
Component B
20–50 parts of component a
80–50 parts of component b
1000–5000 parts of distilled water
The dispersion preferably comprises
25–100 parts of component A
100 parts of component B Preference is given to the use of nonionic associative thickeners a). Structural features of such associative thickeners a) are:
  aa) a hydrophilic framework, which ensures adequate solubility in water, and
  ab) hydrophobic groups, which are capable of associative interaction in an aqueous medium.

Examples of hydrophobic groups employed are long-chain alkyl radicals, such as dodecyl, hexadecyl or octadecyl radicals, or alkaryl radicals, such as octylphenyl or nonylphenyl radicals, for example.

As hydrophilic frameworks it is preferred to employ polyacrylates, cellulose ethers or, with particular preference, polyurethanes which include the hydrophilic groups as polymer units.

Very particular preference as hydrophilic frameworks is given to polyurethanes comprising polyether chains as units, preferably chains of polyethylene oxide. In the synthesis of such polyetherpolyurethanes the di- and/or polyisocyanates, preferably aliphatic diisocyanates and, with particular preference, unsubstituted or alkyl-substituted 1,6-hexamethylene diisocyanate, serve to link the hydroxyl-terminated polyether units with one another and to link the polyether units with the hydrophobic end-group units, which may, for example, be monofunctional alcohols and/or amines having the abovementioned long-chain alkyl radicals or aralkyl radicals.

The aqueous transparent powder coating dispersion can be prepared from the components A and B by wet grinding or by introduction of dry-ground powder coating material with stirring. Particular preference is given to wet grinding.

The present invention also relates accordingly to a process for preparing an aqueous powder coating dispersion based on the described component A which, in accordance with the invention, is dispersed in a component B.

In other words, following the dispersion of component A in component B, the composition is ground, the pH is adjusted to from 4.0 to 7.0, preferably from 5.5 to 6.5, and the composition is filtered.

The average particle size lies between 1 and 25 $\mu$m, preferably below 20 $\mu$m and, with particular preference, from 2 to 10 $\mu$m. The solids content of the aqueous transparent powder coating dispersion lies between 15 and 50%.

Before or after wet grinding or the introduction of the dry powder coating into the water, it is possible to add to the dispersion from 0 to 5% by weight of a defoamer mixture, of an ammonium salt and/or alkali metal salt, of a carboxyl-functional or nonionic dispersing auxiliary, of a wetting agent and/or thickener mixture and of the other additives. Preferably, defoamers, dispersing auxiliaries, wetting agents and/or thickeners are first of all dispersed in water. Then small portions of the transparent powder coating material are introduced with stirring. Subsequently, defoamers, dispersing auxiliaries, thickeners and wetting agents are again incorporated by dispersion. Finally, transparent powder coating materials are stirred in again in small portions.

The pH is adjusted preferably using ammonia or amines. When this is done the pH may initially rise, giving a strongly basic dispersion. However, the pH falls again within a number of hours or days, back to the levels indicated above.

The transparent powder coating dispersion can be used as a coating for basecoats, preferably in the automotive industry. The transparent coating dispersion is particularly suitable for waterborne coating materials based on a polyester, a polyurethane resin and an amino resin.

The transparent powder coating dispersion can be applied by the methods known from liquid coating technology. In particular, they can be applied by means of spraying processes. Electrostatically assisted high-speed rotation or pneumatic application are likewise suitable.

The transparent powder coating dispersions applied to the basecoat layer are generally flashed off prior to stoving. This takes place judiciously first at room temperature and then at a slightly elevated temperature. In general, the elevated temperature is from 40 to 70° C., preferably from 50 to 65° C. Flashing off is carried out for from 2 to 10 minutes, preferably from 4 to 8 minutes, at room temperature. At elevated temperature, flashing off is repeated for the same period of time.

Stoving can be carried out at temperatures as low as 130° C. It is possible to carry out stoving at from 130 to 180° C., preferably from 135 to 155° C.

With the process of the invention it is possible to obtain layer thicknesses of from 30 to 50, preferably from 35 to 45 $\mu$m. Using transparent powder coating materials, clearcoats of comparable quality have to date been achievable, in accordance with the state of the art, only by applying layer thicknesses of from 65 to 80 $\mu$m. It is particularly surprising that with the crosslinker employed in accordance with the invention the etch resistance to water, tree resin and sulphuric acid is improved and the tendency towards yellowing is significantly reduced.

In the text below, the invention is described in more detail with reference to the examples:

1. PREPARING THE ACRYLATE RESIN 21.1 parts of xylene are introduced into a vessel and are heated to 130° C. The following components are metered into the initial charge at 130° C. over the course of 4 h by way of two separate feed containers: initiator: 4.5 parts of TBPEH (tertbutyl perethylhexanoate) mixed with 4.86 parts of xylene, and monomers: 10.78 parts of methyl methacrylate, 25.5 parts of n-butyl methacrylate, 17.39 parts of styrene and 23.95 parts of glycidyl methacrylate. The mixture is subsequently heated to 180° C. and the solvent is stripped off in vacuo <100 mbar.

2. COMPARATIVE EXAMPLE

Powder Coating Material for Subsequent Use in the Powder Dispersion 77.5 parts of acrylate resin, 18.8 parts of dodecanedioic acid, 2 parts of Tinuvin 1130 (UV absorber), 0.9 part of Tinuvin 144 (HALS) and 0.4 part of Additol XL 490 (levelling agent) are intimately mixed in a Henschel fluid mixer, the mixture is extruded on a BUSS PLK 46 extruder, the extrudate is ground in a Hosokawa ACM 2 mill, and the ground material is screened through a 125 $\mu$m sieve.

3. INVENTIVE EXAMPLE

Powder Coating Material for Subsequent Use in the Powder Dispersion 73.5 parts of acrylic resin, 17.8 parts of dodecanedioic acid, 5.0 parts of tris(alkoxycarbonylamino)triazine, 2 parts of Tinuvin 1130 (UV absorber), 0.9 part of Tinuvin 144 (HALS) and 0.4 part of Additol XL 490 (levelling agent) are intimately mixed in a Henschel fluid mixer, the mixture is extruded on a BUSS PLK 46 extruder, the extrudate is ground in a Hosokawa ACM 2 mill, and the ground material is screened through a 125 $\mu$m sieve.

4. PREPARING THE DISPERSION 0.6 part of Troykyd D777 (defoamer), 0.6 part of Orotan 731 K (dispersing auxiliary), 0.06 part of Surfynol TMN 6 (wetting agent) and 16.5 parts of RM8 (Rohm & Haas, nonionic associative thickener based on polyurethane) are dispersed in 400 parts of deionized water. Then, in small portions, 94 parts of the transparent powder coating material are stirred in. Subsequently, a further 0.6 part of Troykyd D777, 0.6 part of Oroton 731 K, 0.06 part of Surfynol TMN 6 and 16.5 parts of RM8 are incorporated by dispersion.

Finally, in small portions, 94 parts of transparent powder coating material are stirred in. The material is ground for 3.5 h in a sand mill. The finally measured average particle size is 4 µm. The material is filtered through a 50 µm filter, and finally 0.05% of Byk 345 (levelling agent) is added.

5. APPLYING THE DISPERSION

The dispersion is applied using a cup gun to steel panels coated (cathodically) with commercially customary electrodeposition coating material. The metal panel is flashed off at room temperature for 5 minutes and at 60° C. for 5 minutes. It is subsequently stoved for 30 minutes at a temperature of 140° C.

6. TESTING THE YELLOWING OF THE POWDER DISPERSION

The yellowness (GW) of samples prepared in accordance with 5, is determined in accordance with DIN6127.

Comparative Example: GW +2.84.

Inventive Example: GW −1.31.

What is claimed is:

1. A transparent powder coating dispersion comprising a solid, pulverulent component A and an aqueous component B, component A being a powder coating material comprising
   a) at least one epoxy-containing binder having a content of from 25 to 45% of glycidyl-containing monomers,
   b) a crosslinking agent comprising a member selected from the group consisting of tris (alkoxycarbonylamino)triazines, derivatives of tris (alkoxycarbonylamino)triazines, and mixtures thereof, and
   c) optionally, one or members selected from the group consisting of catalysts, auxiliaries, additives, degassing agents, leveling agents, UV absorbers, free-radical scavengers, antioxidants, and mixtures thereof, and
component B being an aqueous dispersion comprising
   a) at least one nonionic thickener and
   b) optionally, catalysts, auxiliaries, defoamers, wetting agents, dispersing auxiliaries, carboxy-functional dispersants, antioxidants, UV absorbers, free-radical scavengers, biocides, solvent, leveling agents, neutralizing agents, amines, water retention agents, and mixtures thereof.

2. The transparent powder coating dispersion of claim 1, comprising from 0.5–15-% by weight of a tris (alkoxycarbonylamino)triazine.

3. The transparent powder coating dispersion of claim 1, wherein component (a) further comprises one or more vinylaromatic compounds.

4. The transparent powder coating dispersion of claim 1, wherein component (a) comprises an epoxy-functional polyacrylate resin and the epoxy-functional monomers are selected from the group consisting of glycidyl acrylate, glycidyl methacrylate, allyl glycidyl ether, and mixtures thereof.

5. The transparent powder coating dispersion of claim 1, having a pH from between 4.0–7.0.

6. The transparent powder coating dispersion of claim 1, having a particle size of not more than 20 µm.

7. The transparent powder coating dispersion of claim 1, wherein component B comprises as nonionic thickener a) at least one nonionic associative thickener comprising as structural features:
   aa) a hydrophilic framework and
   ab) hydrophobic groups capable of associative interaction in an aqueous medium.

8. The transparent powder coating dispersion of claim 7, wherein the nonionic associative thickener a) in the dispersion comprises polyurethane chains as hydrophilic framework aa).

9. The transparent powder coating dispersion of claim 8, wherein the nonionic associative thickener a) in the dispersion comprises polyurethane chains having polyether units as hydrophilic framework aa).

10. A process for preparing a powder coating dispersion comprising
   I. preparing a dispersion from a solid, pulverulent component A and an aqueous component B, component A comprising a transparent powder coating material comprising
      a) at least one epoxy-containing binder having a content of from 25 to 45% by weight of glycidyl-containing monomers,
      b) a crosslinking agent comprising a member selected from the group consisting of tris (alkoxycarbonylamino)triazines, derivatives of tris (alkoxycarbonylamino)triazines, and mixtures thereof, and
      c) optionally one or more members selected from the group consisting of catalysts, auxiliaries, additives, degassing agents, leveling agents, UV absorbers, free-radical scavengers, antioxidants, and mixtures thereof, and
   component B comprising an aqueous dispersion comprising
      a) at least one nonionic thickener and
      b) optionally, one or more members selected from the group consisting of catalysts, auxiliaries, defoamers, dispersing auxiliaries, wetting agents, carboxy-functional dispersants, antioxidants, UV absorbers, leveling agents, neutralizing agents, preferably amines, free-radical scavengers, solvent, biocides, water retention agents, and mixtures thereof, and
   II. and optionally grinding the dispersion prepared from component A and B, and
   III. adjusting the pH of the dispersion to from 4.0 to 7.0, and filtering the composition.

11. The process of claim 10, further comprising wet grinding the transparent powder coating dispersion prepared from components A and B.

12. A method for coating coated and uncoated car bodies made from metal sheet and/or plastic by means of electrostatically assisted high-speed rotation or pneumatic application, comprising applying to a substrate the transparent powder coating dispersion of claim 1.

13. The transparent powder coating dispersion of claim 1 wherein crosslinking agent (b) further comprises one or more members selected from the group consisting of polycarboxylic acids, straight-chain aliphatic dicarboxylic acids, carboxy-functional polyesters, and mixtures thereof.

14. The transparent powder coating dispersion of claim 2, comprising from 1 to 10% by weight of a tris (alkoxycarbonylamino)triazine.

15. The transparent powder coating dispersion of claim 3, wherein component (a) comprises not more than 35 weight percent of one or more vinylaromatic compounds, based on component a).

16. The transparent powder coating dispersion of claim 5, having a pH from between 5.5 and 6.5.

17. A transparent powder coating dispersion comprising a solid, pulverulent component A and an aqueous component B, component A being a powder coating material comprising
   a) at least one epoxy-containing binder having a content of from 25 to 45% of glycidyl-containing monomers;

b) a crosslinking agent comprising a member selected from the group consisting of tris(alkoxycarbonylamino)triazines, derivatives of tris(alkoxycarbonylamino)triazines, and mixtures thereof; and c) optionally, one or members selected from the group consisting of catalysts, auxiliaries, additives, degassing agents, leveling agents, UV absorbers, free-radical scavengers, antioxidants, and mixtures thereof;

component B being an aqueous dispersion comprising a) at least one nonionic thickener and b) optionally, catalysts, auxiliaries, defoamers, wetting agents, dispersing auxiliaries, carboxy-functional dispersants, antioxidants, UV absorbers, free-radical scavengers, biocides, solvent, leveling agents, neutralizing agents, amines, water retention agents, and mixtures thereof; and wherein the crosslinking agent is present in an amount from 1 to 10% by weight of the composition.

18. A process for preparing a powder coating dispersion comprising

I. preparing a dispersion from a solid, pulverulent component A and an aqueous component B, component A comprising a transparent powder coating material comprising a) at least one epoxy-containing binder having a content of from 25 to 45% by weight of glycidyl-containing monomers, b) a crosslinking agent comprising a member selected from the group consisting of tris(alkoxycarbonylamino)triazines, derivatives of tris(alkoxycarbonylamino)triazines, and mixtures thereof, and c) optionally one or more members selected from the group consisting of catalysts, auxiliaries, additives, degassing agents, leveling agents, UV absorbers, free-radical scavengers, antioxidants, and mixtures thereof, and component B comprising an aqueous dispersion comprising a) at least one nonionic thickener and b) optionally, one or more members selected from the group consisting of catalysts, auxiliaries, defoamers, dispersing auxiliaries, wetting agents, carboxy-functional dispersants, UV absorbers, leveling agents, neutralizing agents, preferably amines, free-radical scavengers, solvent, biocides, water retention agents, and mixtures thereof, and II. and optionally grinding the dispersion prepared from component A and B, and III. adjusting the pH of the dispersion to from 4.0 to 7.0, and filtering the composition;

wherein the crosslinking agent is present in an amount from 1 to 10% by weight of the composition.

* * * * *